(12) United States Patent
Park

(10) Patent No.: US 7,275,613 B2
(45) Date of Patent: Oct. 2, 2007

(54) AUTOMATIC UNBUCKLING SEAT BELT SYSTEM

(75) Inventor: Bum-Choon Park, Seoul (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 308 days.

(21) Appl. No.: 10/884,588

(22) Filed: Jul. 2, 2004

(65) Prior Publication Data

US 2005/0000069 A1    Jan. 6, 2005

(30) Foreign Application Priority Data

Jul. 3, 2003    (KR) .................... 10-2003-0045012

(51) Int. Cl.
*B60R 21/00* (2006.01)
(52) U.S. Cl. .................... 180/270; 280/801.1
(58) Field of Classification Search ................ 280/727, 280/801.1, 807; 810/268, 270, 286, 289; 24/628, 603; 180/268, 270, 286, 289
See application file for complete search history.

(56) References Cited

U.S. PATENT DOCUMENTS

| 3,963,090 | A | * | 6/1976 | Hollins ................ 180/268 |
| 4,553,625 | A |   | 11/1985 | Tsuge et al. |
| 4,678,928 | A | * | 7/1987 | Nishimura et al. ......... 180/282 |
| 5,123,498 | A | * | 6/1992 | Alcidi et al. ................ 180/268 |
| 5,133,425 | A | * | 7/1992 | Han ........................... 180/270 |
| 6,895,643 | B2 | * | 5/2005 | Itoigawa et al. .............. 24/633 |
| 6,965,231 | B1 | * | 11/2005 | Cinoglu et al. ............. 324/300 |

* cited by examiner

*Primary Examiner*—Paul N. Dickson
*Assistant Examiner*—Tiffany L. Webb
(74) *Attorney, Agent, or Firm*—Morgan Lewis & Bockius LLP

(57) ABSTRACT

The present invention relates to an automatic unbuckling seat belt system adapted to easily buckle and unbuckle the seat belt, wherein the system comprises a seat belt tongue formed with a groove and a seat belt buckle with a latch for suspending in the groove and maintaining the coupled state with the seat belt tongue. An ignition key detecting switch detects whether the ignition key is inserted. An Electronic Control Unit (ECU) controls the latch of the seat belt buckle to be removed from the groove of the seat belt tongue if the ignition key detecting switch detects that the ignition key is taken out. A first relay provides power by being activated according to the control of the ECU. A first electromagnet generates the magnetic force via the power provided through the first relay and pulls the latch from the groove.

9 Claims, 4 Drawing Sheets

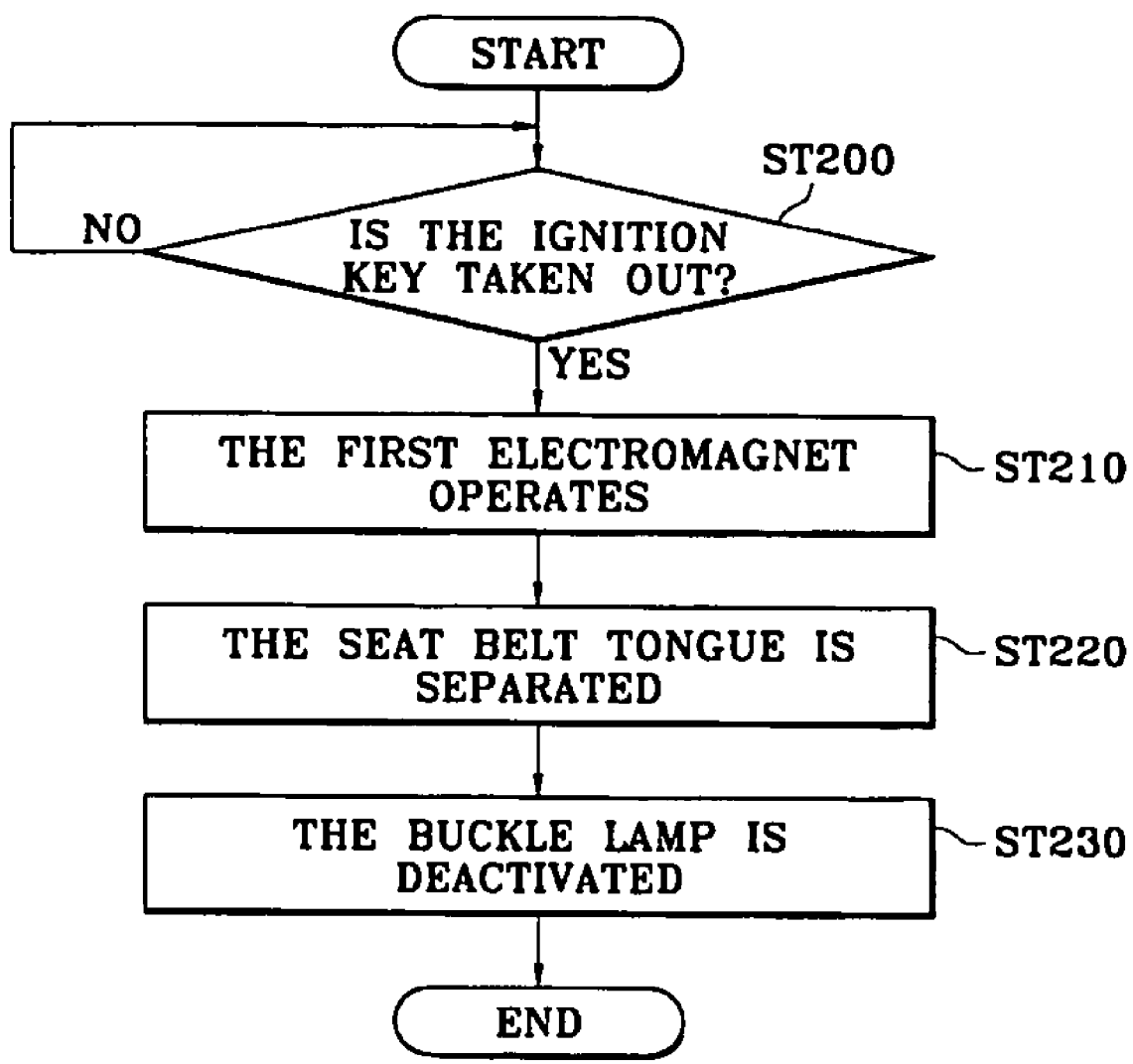

AUTOMATIC UNBUCKLING SEAT BELT SYSTEM

CROSS-REFERENCE TO RELATED APPLICATIONS

This application claims priority of Korean Application No. 10-2003-0045012, filed on Jul. 3, 2003, the disclosure of which is incorporated fully herein by reference.

FIELD OF THE INVENTION

The present invention relates to a vehicle seat belt and, more particularly, to an automatic unbuckling seat belt system whereby a driver can conveniently use the seat belt under normal driving conditions and quickly unbuckle the belt in emergency situations.

BACKGROUND OF THE INVENTION

In general, a vehicle's seat belt is designed to protect the driver during a vehicle collision or the like to prevent injury. The seat belt, constructed with two or three supporting points, typically supports a driver's abdominal region and the chest. The buckling and unbuckling operation of the seat belt is normally manually performed. Therefore, there is a drawback in the conventional seat belt system in that the manual manipulation of the seat belt is inconvenient in emergency situations such as when escaping from the vehicle in the event of a vehicle collision or the like.

SUMMARY OF THE INVENTION

A preferred embodiment of the present invention provides an automatic unbuckling seat belt system employing an electromagnet. If the ignition key is taken out, the seat belt is automatically unbuckled, providing a convenience to the driver when he or she exits the vehicle.

In the preferred embodiment of the present invention, the automatic unbuckling seat belt system comprises a seat belt tongue formed with a groove. A seat belt buckle has a latch that it suspended in the groove to maintain a coupled state with the seat belt tongue, coupling to the seat belt tongue's groove. An ignition key detecting switch detects whether the ignition key is inserted into the ignition. An Electronic Control Unit (ECU) controls the removal of the seat belt buckle's latch from the seat belt tongue's groove if the ignition key detecting switch detects that the ignition key is taken out. A latch driving means removes the seat belt buckle's latch from the seat belt tongue's grove according to the control of the ECU.

The latch driving means includes a first relay that provides power when activated by the ECU. A first electromagnet generates the magnetic force by the power provided through the first relay and removes the latch by pulling it from the groove.

A spring is further equipped between the first electromagnet and the latch, and the spring pushes the latch to suspend it in the seat belt tongue's groove.

A seat belt releasing switch, mounted on the seat belt buckle, is equipped for releasing the coupled state of the seat belt, wherein once the seat belt releasing switch is manipulated, the ECU controls the latch driving means to remove the seat belt buckle's latch from the seat belt tongue's groove.

The automatic unbuckling seat belt system further comprises a first detecting switch equipped at the inlet of the seat belt buckle for detecting the initial insertion of the seat belt tongue into the seat belt buckle. A second detecting switch is equipped inside the seat belt buckle for detecting the complete insertion of the seat belt tongue into the seat belt buckle. A second electromagnet is equipped inside the seat belt buckle for pulling the seat belt tongue. A second relay provides power to the second electromagnet, wherein if the initial insertion of the seat belt tongue is detected by the first detecting switch, the ECU activates the second relay to pull the seat belt tongue, and if the complete insertion of the seat belt tongue is detected by the second detecting switch, then the ECU deactivates the second relay, thereby deactivating the second electromagnet.

The second detecting switch further comprises a contacting end being in contact to a front end of the seat belt tongue. A spring is installed at a rear side of the contacting end to provide resilience to the contacting end.

The seat belt buckle is equipped with a lamp, wherein if the seat belt is unfastened while the ignition key is inserted, then the ECU illuminates the lamp.

An opened and closed door detecting switch is further equipped to detect whether the vehicle door opens, wherein the ECU illuminates the lamp if the vehicle door opens, and turns off the lamp after a certain period of time if the door closes.

BRIEF DESCRIPTION OF THE DRAWINGS

For a better understanding of the nature and objects of the present invention, reference should be made to the following detailed description with the accompanying drawings, in which:

FIG. 4 is a flowchart representing an unbuckling procedure of an automatic unbuckling seat belt system for a vehicle when the ignition key is taken out according to an embodiment of the present invention.

DETAILED DESCRIPTION OF THE PREFERRED EMBODIMENTS

The preferred embodiment of the present invention will now be described in detail with reference to the attached drawings.

Figure 1:
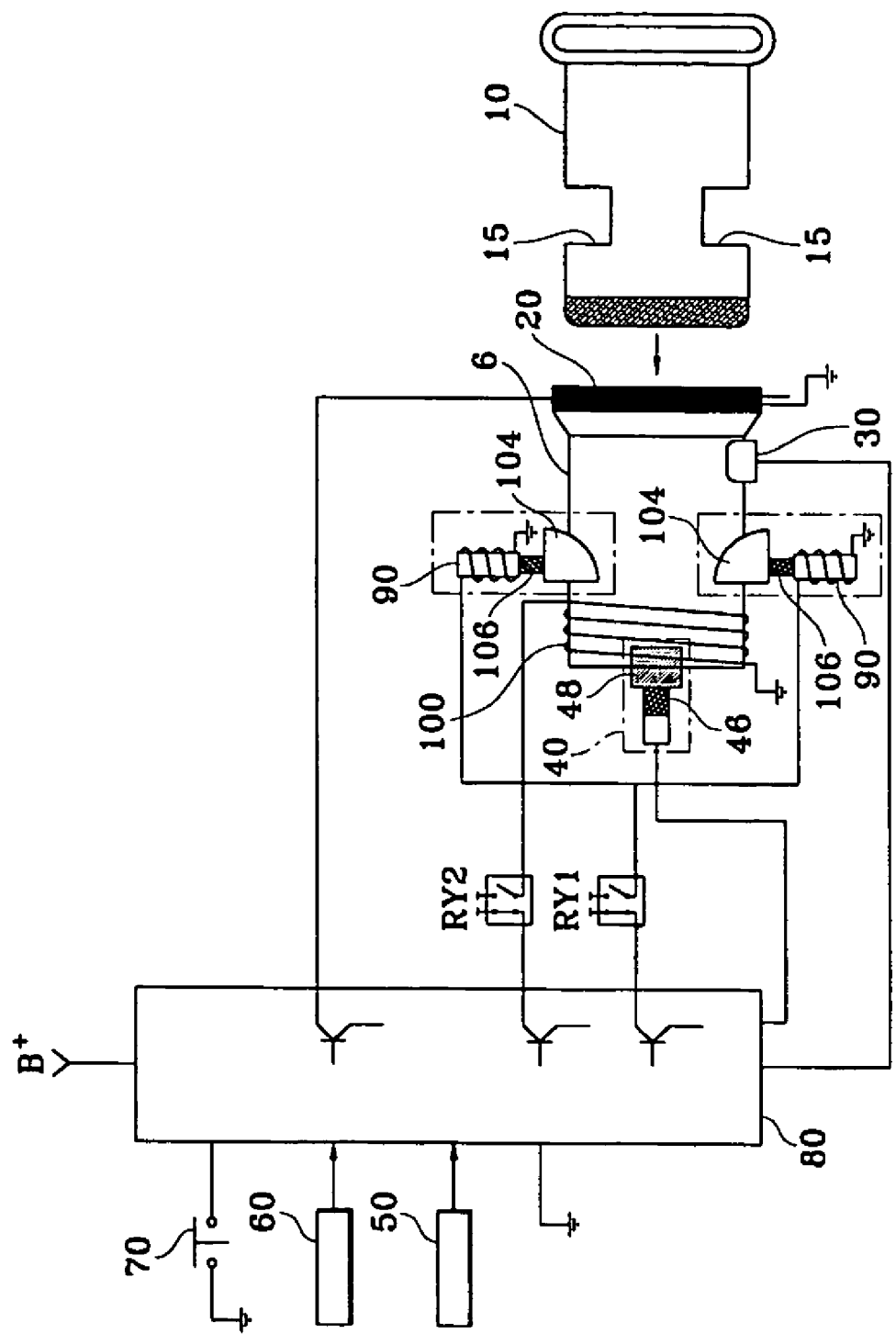
FIG. 1 is a constitutional view of an automatic unbuckling seat belt system for a vehicle according to an embodiment of the present invention.

Referring to FIG. 1, the present invention comprises a seat belt tongue 10 formed with grooves 15 at both sides of the tongue. A buckle lamp 20 is installed at a seat belt buckle 6 and illuminates when a door opens. A first detecting switch 30 is equipped at the inlet portion of the seat belt buckle 6 and outputs a signal when it detects the initial insertion of the seat belt tongue 10. A second detecting switch 40 is equipped at the farthest inner side of the seat belt buckle 6 and outputs a signal in the event of contact with the seat belt tongue 10. An ignition key detecting switch 50 detects the insertion of the ignition key into the ignition and outputs a signal. An opened and closed door detecting switch 60 detects whether the vehicle door is opened or closed. A seat belt releasing switch 70 is manipulated for unbuckling the seat belt. An Electronic Control Unit (ECU) 80 receives signals outputted from the switches (30, 40, 50, 60, and 70) and outputs a control signal according to a preset program. A first relay and second relay (RY1 and RY2) restrict the power provision according to the control signal outputted from the ECU 80. A first electromagnet 90 generates a magnetic force via power applied through the first relay (RY1) and pulls a latch 104 for releasing the coupled state of the seat belt tongue 10. A second electromagnet 100 is mounted at the opposite side of the inlet of the seat belt buckle 6 and generates a magnetic force via power applied through the second relay (RY2).

The second detecting switch 40 includes a contacting end 48 and a spring 46, wherein the contacting end 48 contacts with one end of the seat belt tongue 10, and the spring 46 is installed at a rear side of the contacting end 48 for applying resilience to the contacting end 48.

The seat belt releasing switch 70 is preferably equipped at the seat belt buckle 6.

The first electromagnet 90 is mounted at both sides of the seat belt buckle 6 and a spring 106 is equipped between the first electromagnet 90 and latch 104. Accordingly, the latch 104 is designed to be suspended in the groove 15 of the seat belt tongue 10 by the resilience of the spring 106.

Figure 2:
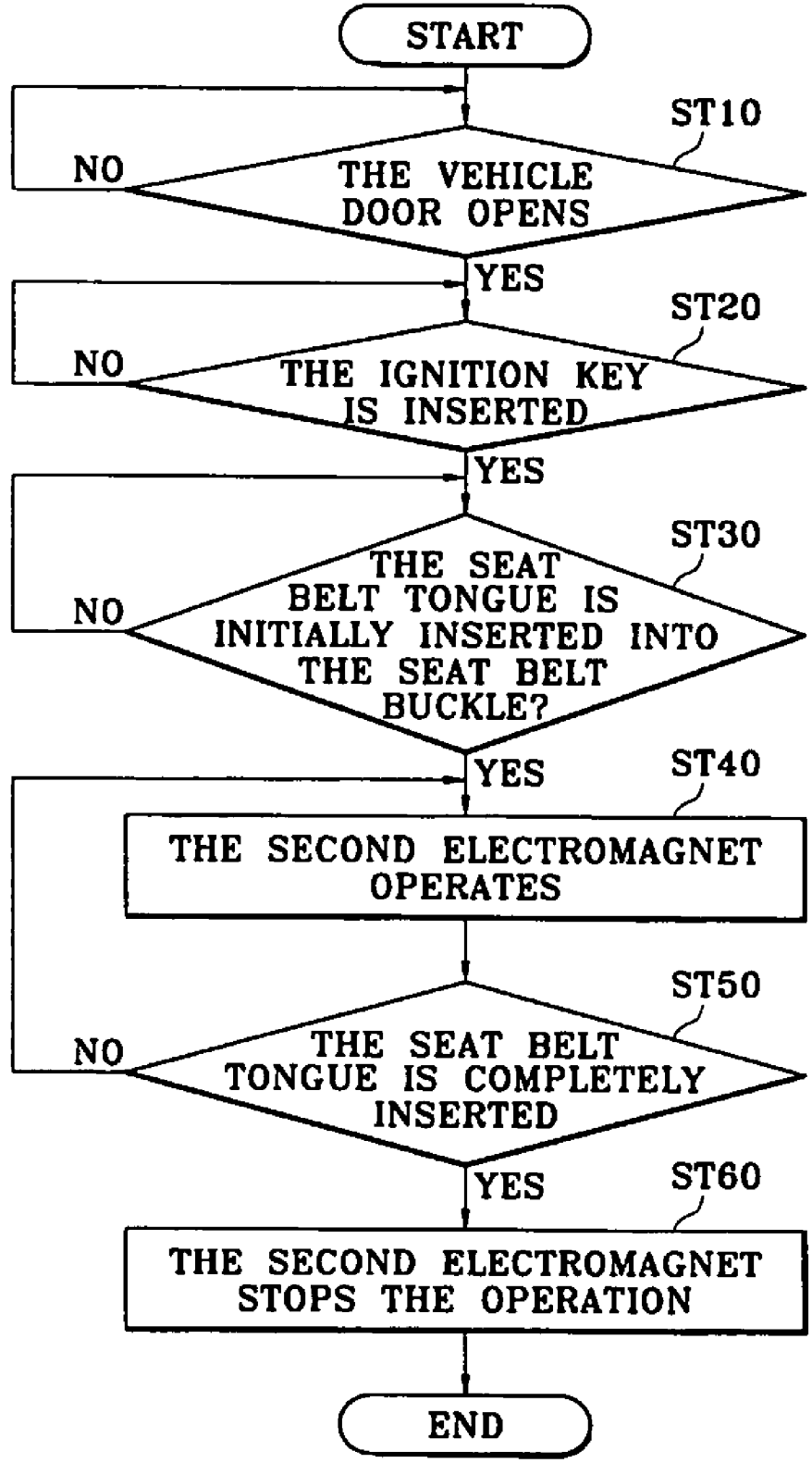
FIG. 2 is a flowchart representing a buckling procedure of an automatic unbuckling seat belt system for a vehicle according to an embodiment of the present invention.

With reference to FIG. 2, a buckling procedure of the seat belt according to an embodiment of the present invention comprises the steps of detecting whether the vehicle door is opened (ST10); detecting whether the ignition key is inserted (ST20); detecting whether the seat belt tongue 10 is initially inserted into the seat belt buckle 6 (ST30); activating the second electromagnet 100 in the event of insertion of the seat belt tongue 10 (ST40); outputting a signal when the seat belt tongue 10 is completely inserted (ST50); and deactivating the second electromagnet 100 (ST60).

Figure 3:
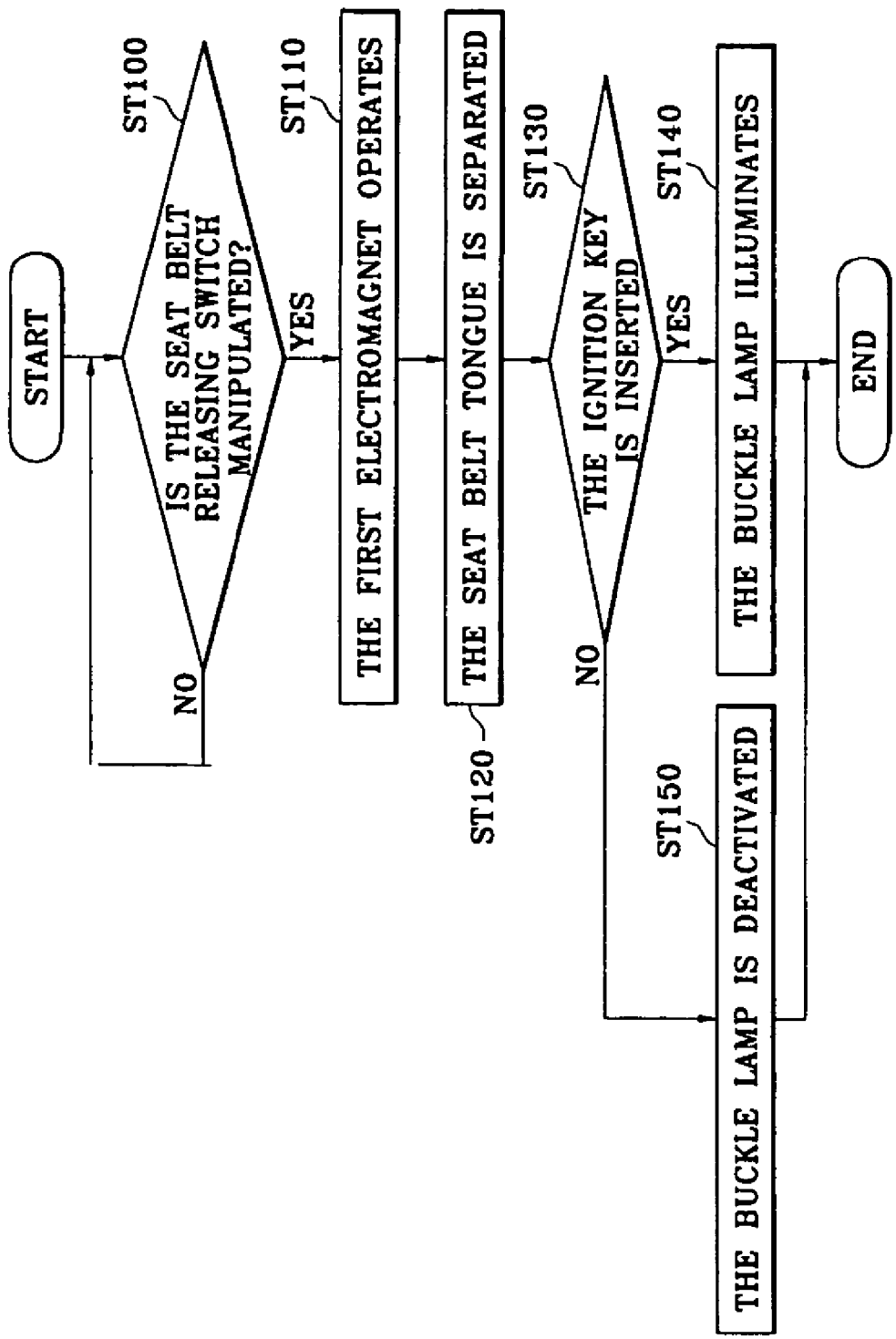
FIG. 3 is a flowchart representing an unbuckling procedure of an automatic unbuckling seat belt system for a vehicle by a manipulation of a seat belt releasing switch according to an embodiment of the present invention.

With reference to FIG. 3, an unbuckling procedure of the seat belt by the manipulation of the seat belt releasing switch according to an embodiment of the present invention comprises the steps of detecting the manipulation of the seat belt releasing switch 70 (ST100); activating the first electromagnet 90 when the seat belt releasing switch 70 is manipulated (ST110); releasing the coupled state of the seat belt tongue 10 by activation of the first electromagnet 90 (ST120); detecting whether the ignition key is inserted (ST130); illuminating the buckle lamp 20 when the ignition key is inserted (ST140); and turning off the light of the buckle lamp 20 if the ignition key is not inserted (ST150).

As illustrated in FIG. 4, the unbuckling procedure of the seat belt when the ignition key is taken out according to an embodiment of the present invention comprises the steps of detecting whether the ignition key is taken out (ST200); activating the first electromagnet 90 when the ignition key is withdrawn (ST210); releasing the coupled state of the seat belt tongue 10 by activation of the first electromagnet 90 (ST220); and turning off the light of the buckle lamp 20 (ST230).

The operation and effect of the embodiment of the present invention will now be described in detail.

As shown in FIG. 2, when the driver opens the vehicle door to enter the vehicle (ST10), the opened and closed door detecting switch 60 detects the opened door and the ECU 80 illuminates the buckle lamp 20 installed at the seat belt buckle 6 to notify the driver of the location of the seat belt buckle even in the dark. If the driver inserts the ignition key after sitting on the seat (ST20) and introduces the seat belt tongue 10 into the seat belt buckle 6 (ST30), the first detecting switch (30) equipped at the inlet of the seat belt buckle 6 detects the initial insertion of the seat belt tongue 10 and outputs a detecting signal to the ECU 80.

The ECU 80 activates (ON) the second relay (RY2) when the detecting signal is received and applies battery power (B+) to the second electromagnet 100 through the second relay (RY2), thus allowing the second electromagnet 100 to generate magnetic force (ST40). The seat belt tongue 10 is pulled by the magnetic force generated at the second electromagnet 100 so that the seat belt tongue 10 is completely inserted into the seat belt buckle 6 even with minimal force. The latch 104 suspends in the grooves 15 of both sides of the seat belt tongue 10 and the coupling of the seat belt is completed. When a front end of the seat belt tongue 10 contacts the contacting end 48 of the second detecting switch 40, the second detecting switch 40 outputs a detecting signal to the ECU 80, wherein the detecting signal represents the complete coupling of the seat belt (ST50). The ECU 80 deactivates (OFF) the second relay (RY2) when the detecting signal is received. The battery power to the second electromagnet 100 is this cut off and the second electromagnet does not generate magnetic force (ST60). Once the seat belt is in a complete coupling state, the ECU 80 turns off the light of the buckle lamp 20.

With reference to FIG. 3, in order to release the coupling state of the seat belt when the driver gets out of the vehicle, the driver manipulates the seat belt releasing switch 70 (ST100). The ECU 80 detects the manipulation of the seat belt releasing switch 70 and activates (ON) the first relay (RY1). When the first relay (RY1) is activated (ON), the first electromagnet 90 is applied with battery power (B+) and generates magnetic force (ST110). Once the first electromagnet 90 generates magnetic force, the latch 104 is pulled out of its suspended position in the groove 15 of the seat belt tongue 10, enabling the seat belt tongue 10 to separate from the seat belt buckle 6. The resilient force applied by the spring 46 of the second detecting switch 40 is transmitted to the seat belt tongue 10 through the contacting end 48 the seat belt tongue 10 is pushed out. Thus, the seat belt tongue 10 is decoupled from the seat belt buckle 6 and the coupling of the seat belt is released (ST120). Then, the ignition key detecting switch 50 detects whether the ignition key is inserted (ST130) and inputs the result to the ECU 80. If the ignition key is inserted, the ECU 80 determines that the vehicle is in a temporarily parked state and turns on the light of the buckle lamp 20 to aid the driver to re-buckle the seat belt (ST140). However, if the ignition key is withdrawn, the ECU 80 determines that the vehicle driving is finished and turns off the light of the buckle lamp 20 (ST150).

On the other hand, as illustrated in FIG. 4, if the vehicle stops and the ignition key is withdrawn, the ignition key detecting switch 50 detects the above states and inputs a detecting signal to the ECU 80 (ST200). Accordingly, the ECU 80 activates (ON) the first relay (RY1) and applies battery power (B+) to the first electromagnet 90, causing the first electromagnet 90 to generate magnetic force (ST210). The magnetic force of the first electromagnet 90 pulls the latch 104, pulling the latch from its suspended position in the groove 15 of the seat belt tongue 10, resulting in a release of the coupled state of the seat belt tongue 10 (ST220). The resilient force of the spring 46 of the second detecting switch 40 is transmitted to the seat belt tongue 10 through the contacting end 48, and the seat belt tongue 10 is pushed out from the seat belt buckle 6, thus releasing the coupling of the seat belt. As the coupling state of the seat belt is released, the ECU 80 deactivates the buckle lamp 20 (ST230). The driver can now open the door and exit the vehicle as a result of the released coupling state of the seat belt.

The embodiment of the present invention may be modified by a person having ordinary knowledge of the technical field in this art as long as the embodiments are in the scope of the intrinsic characteristic of the present invention. Thus, the technical concept is not limited to the above embodiments. As apparent from the foregoing, there is an advantage in the present invention in that a lamp illuminates when the vehicle door is opened, allowing a driver to easily locate the seat belt. There is another advantage in that the coupling and release of the seat belt tongue and seat belt buckle is performed by the magnetic force of the electromagnet, resulting in a more convenient use of the seat belt. There is a further advantage in that the seat belt is automatically withdrawn if the ignition key is taken out, thus enabling the driver to conveniently exit the vehicle.

What is claimed is:

1. An automatic unbuckling seat belt system of a seat belt, the system comprising:
    a seat belt tongue formed with a groove;
    a seat belt buckle having a latch for engaging in said groove and maintaining a coupled state with said seat belt tongue;
    an ignition key detecting switch for detecting whether an ignition key is inserted;
    an Electronic Control Unit (ECU) for controlling said latch of said seat belt buckle to be separated from said groove of said seat belt tongue if said ignition key detecting switch detects that said ignition key is taken out; and
    latch driving means for separating said latch of said seat belt buckle from said groove of said seat belt tongue according to the control of said ECU.

2. The system as defined in claim 1, wherein said latch driving means includes:
    a first relay for providing power by being activated according to the control of said ECU; and
    a first electromagnet for generating magnetic force via the power provided through said first relay and for pulling said latch to separate from said groove of said seat belt tongue.

3. The system as defined in claim 2, wherein a spring is further equipped between said first electromagnet and said latch, wherein said spring extends to engage said latch in said groove of said seat belt tongue.

4. The system as defined in claim 2, wherein the system further comprises:
    a first detecting switch equipped at an inlet of said seat belt buckle for detecting an initial insertion of said seat belt tongue into said seat belt buckle;
    a second detecting switch equipped inside said seat belt buckle for detecting a complete insertion of said seat belt tongue;
    a second electromagnet equipped inside said seat belt buckle for pulling said seat belt tongue; and
    a second relay for providing power to said second electromagnet, wherein if the initial insertion of said seat belt tongue is detected by said first detecting switch, said ECU activates said second relay to provide power to said second electromagnet for pulling said seat belt tongue, and if the complete insertion of said seat belt tongue is detected by said second detecting switch, then said ECU deactivates said second relay.

5. The system as defined in claim 4, wherein said second detecting switch further comprises:
    a contacting end being in contact to a front end of said seat belt tongue; and
    a spring installed at a rear side of said contacting end for applying resilience to said contacting end.

6. The system as defined in claim 1, wherein a seat belt releasing switch is further equipped for releasing the coupled state of the seat belt, wherein once said seat belt releasing switch is manipulated, said ECU controls said latch driving means to remove said latch of said seat belt buckle from said groove of said seat belt tongue.

7. The system as defined in claim 6, wherein said seat belt releasing switch is configured to be mounted on said seat belt buckle.

8. The system as defined in claim 1, wherein said seat belt buckle is equipped with a lamp, wherein if the seat belt is unbuckled while the ignition key is inserted, then said ECU illuminates said lamp.

9. The system as defined in claim 8, wherein an opened and closed door detecting switch is further equipped to detect whether a vehicle door opens, wherein said ECU illuminates said lamp if the vehicle door opens, and turns off the light of said lamp after a certain period of time if the vehicle door closes.

* * * * *